June 20, 1967   N. H. SACHNIK   3,326,516
HIGH PRESSURE PLUG VALVE
Filed March 17, 1964

INVENTOR.
NORMAN H. SACHNIK
BY *[signature]*
ATTORNEY

United States Patent Office
3,326,516
Patented June 20, 1967

3,326,516
HIGH PRESSURE PLUG VALVE
Norman H. Sachnik, Houston, Tex., assignor to Texsteam Corporation
Filed Mar. 17, 1964, Ser. No. 352,566
1 Claim. (Cl. 251—214)

This invention relates in general to a high pressure plug valve for use in controlling the flow of fluids, and more particularly to a valve capable of handling highly corrosive liquids.

The valve of the present invention is primarily useful in fluid lines for selectively shutting off fluid flow between any two desired areas. The valve includes a body having a plug chamber disposed between an inlet and an outlet and a bonnet through which the stem of a plug projects and about which the plug is mounted on the body and sealed therewith. The inlet and outlet are axially aligned and provided with free floating seats in engagement with the plug. A passageway or bore extends through the plug for selectively providing communication between the inlet and outlet seats. A packing plate unit is provided in the bonnet to function as a corrosion barrier and to form a fluid pressure seal between the plug and a bearing received in the bonnet that bearingly mounts the plug to the valve body. A spring is associated with the stem of the plug for resiliently biasing the plug in position within the plug chamber and thereby effectively providing a free floating plug. The packing plate unit eliminates the need for pressure lubricating the valve and for sealing the plug and seats by use of lubricants.

Heretofore, valves of the type of the present invention have had cumbersome and troublesome lubrication systems that necessitated lubrication maintenance and caused other problems.

Accordingly, it is an object of the present invention to provide a high pressure plug valve that eliminates the above mentioned difficulties by effectively eliminating heretofore known lubrication systems.

Another object of this invention is in the provision of a high pressure plug valve that eliminates the need for a lubricant to hydraulically lift the conventional plug from the associated seats before opening and closing of the valve.

Still another object of this invention is in the provision of a high pressure plug valve that eliminates the need for lubricants to form a seal between the plug and seats.

A further object of this invention is to provide a high pressure plug valve that eliminates lubrication contamination of the fluid being handled by the valve.

A still further object of this invention is in the provision of a high pressure plug valve that eliminates formation plugging from excessive use of lubricants.

Still another object of this invention is to provide a high pressure plug valve that is smaller and lighter in weight than heretofore known valves, and which does not require any lubrication maintenance.

A further object of this invention resides in the provision of providing a high pressure plug valve having a free floating plug and free floating seats that align easily when subjected to severe temperature conditions, vibrations or pipe misalignment.

Other objects, features and advantages of the invention will be apparent from the following detailed disclosure, taken in conjunction with the accompanying sheet of drawing, wherein like reference numerals refer to like parts, in which.

Figure 1:
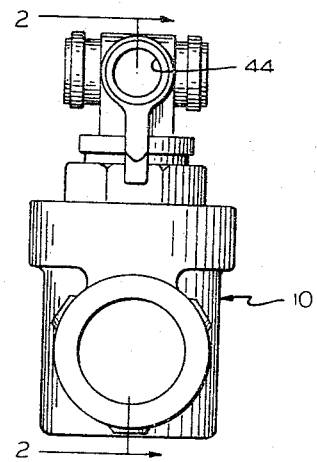
FIG. 1 is an end elevational view of the valve of the present invention.

Referring now to the drawing, the valve of the present invention includes generally a body 10 having an inlet 11, an outlet 12, a plug chamber 13, a bonnet 14, and a plug 15.

The inlet and outlet are shown as tapped openings in this embodiment, but it should be appreciated that this portion of the body may be changed for any other type of connection. Further, while one side opening is designated as the inlet and the other as the outlet, it should be appreciated that these could be interchanged in the present valve as it is immaterial to the direction of flow of fluid therthrough. Further, the inlet and outlet are axially aligned and positioned on opposite sides of the plug chamber 13.

Within the plug chamber 13 and arranged between the plug and the inlet and outlet are floating seats 16 and 17. Each seat is identical and is arranged in association with the plug in identical manner, and therefore only one of the seats will be specifically described in this application.

Referring particularly to the inlet 11, at the inner end of the tapped opening, a stepped bore including steps 18 and 19 provides means for receiving the floating seat 16. The seat 16 includes a main body portion having a cylindrical face 20 that terminates at its inner end 21 to define a curvate mating surface for the base 22 of the plug 15. The diameter of the face 20 is such as to be received within the stepped bore 19. The seat 16 is diametrically reduced at 23 to define a lip that is receivable within the stepped bore 18, and an annular groove 24 is arranged between the face 20 and the lip 23 to define with the stepped bores 18 and 19 a toroidal chamber for receiving a metal ring 25, a rubber O-ring 26 and a petroleum base rust inhibiting agent for defining a seal between the seat and the body. A fluid passageway 27 is formed in the seat 16 and which aligns with a fluid passageway 28 extending through the plug base 22 when the plug 15 is rotated to open the valve.

The plug base 22 is received within the plug chamber 13 and between the seats 16 and 17. Above the plug base 22, a diametrically reduced portion 29 defines with a packing plate bore 30 in the bonnet an annular chamber for receiving a packing plate unit 31. The opening upwardly through the bonnet 14 is diametrically increased and threaded at 32. A retaining nut 33 is received in the threaded bore 32 and provided with an inwardly projecting radial flange 34 for engaging the outer race 35a of a ball bearing 35. The inner race 35b of the ball bearing 35 is received about a diametrically reduced portion 36 extending above the cylindrical face 29. And the inner race 35b is seated against an annular shoulder 37 defined between the cylindrical face 29 and the reduced portion 36. The cylindrically reduced portion 36 extends upwardly and merges with a tapered portion 38 having a blind threaded bore 39 therein. The tapered portion 38 together with the cylindrical portion 36 define a stem for the plug 15.

While the plug 15 is held against movement outwardly through the bonnet by means of the retaining nut 33, the bearing 35 and the shoulder 37, it is resiliently held against movement in the opposite direction or towards the base of the valve body by means of a coil spring 40. Thus, the plug 15 is essentially floating in the body of the valve. The spring 40 is bottomed at one end on the upper side of the flange 34 of the retaining nut 33 and at the other end on a shoulder 41 formed on a handle receiving element 42, the latter of which is fitted down over the tapered portion 38 of the plug stem and held in place by a suitable cap screw 43. Any conventional bar, rod or wrench handle may be inserted in the socket openings 44 of the handle receiving element 42 for rotation of the plug 15 to open and close the valve. In this respect, it should be understood that the handle receiving element 42 is locked to the stem of the plug valve.

Figure 3:
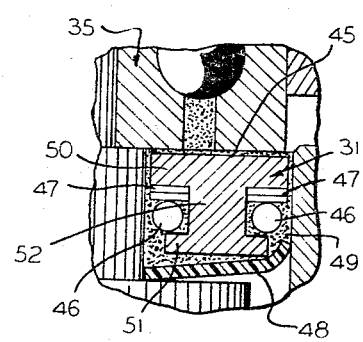
FIG. 3 is an enlarged detail sectional view of the packing plate unit according to the present invention.
Figure 2:
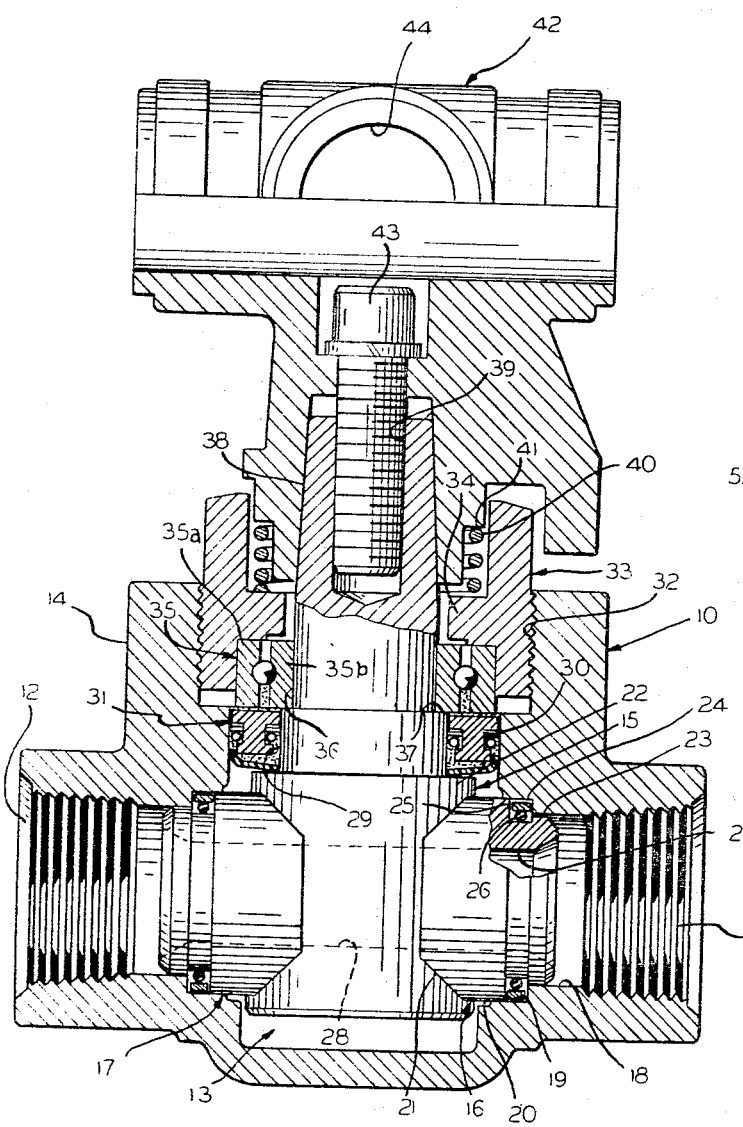
FIG. 2 is a vertical sectional view taken through the valve of the present invention substantially along line 2—2 of FIG. 1.

The packing plate unit 31, as most clearly seen in FIG. 3, defines a corrosion barrier for sealing the bonnet 14 of the valve and for providing permanent protection to the valve. This packing plate unit includes a ring shaped packing plate 45, free floating O-rings 46, Teflon back-up rings 47, a plastic ring-shaped gasket 48, and a petroleum base rust inhibiting agent 49. The packing plate 45 in cross section includes spaced parallel bars 50 and 51 interconnected by a rib or web 52. The bar 50 is substantially larger than the bar 51 and positioned adjacent to the ball bearing 35. The Teflon back-up rings 47 are of two different sizes and arranged against the underside of the bar 50 and respectively on the inner and outer faces of the rib or web 52. The bars 50 and 51 define with the rib or web 52 inner and outer annular grooves for receiving the inner and outer rubber O-rings 46. The grooves are of such size as to loosely receive the O-rings to thereby define them as floating O-rings. The petroleum base rust inhibiting agent 49 is applied over the packing plate 45 and in the open areas defined around the O-rings 46 and between the packing plate and the packing plate bore and plug stem. The plastic gasket 48 is arranged along the underside of the packing plate 45 with its outer peripheral edge turned up as shown in FIG. 3 and in intimate engagement with the petroleum base rust inhibiting agent 49. This gasket 48, bridging the space between the stem and the body, provides protection from the corrosive action of the fluids in the valve body, yet allows for expansion and contraction of the seals and lubricant with fluctuation of valve body pressures and temperatures.

A type of petroleum base rust inhibiting agent found to be suitable is Rust-Ban 324 marketed by Humble Oil and Refining Company. This agent melts at approximately 159° F. and is applied in fluid condition but will thereafter set up to form a durable protective coating. In the present invention, this rust preventive agent is used in mounting the seats 16 and 17 in the body, in assembling and mounting the packing plate unit 31 in the body, in protecting and mounting the bearing 35, and in sealing along the threads 32. With respect to the seats 16, all surfaces are coated with the rust preventive agent, and the annular chamber defined between the body and seat for receiving the ring 25 and O-ring 26 is filled with this agent. Accordingly, the entire valve is protected against corrosion, and is self-lubricated to thereby eliminate the need for a lubrication system.

In assembling the valve of the present invention, the seats 16 and 17 are first properly placed within the body, and then the plug 15 is inserted into the plug chamber between the seats 16 and 17. The packing plate bore 30 and the cylindrical surface 29 of the plug are coated with the rust preventive agent prior to the insertion of the packing plate unit 31. In preparing the packing plate unit, the packing plate 45 is coated with the rust preventive agent, and then the Teflon rings 47 and O-rings 46 are mounted in the appropriate grooves. Then the empty space along the inside and outside of the packing plate is filled with the rust preventive agent. The plastic ring gasket 48, which may be of polyethylene or any other suitable material, is inserted between the packing plate bore 30 and the plug stem, and then followed up with the packing plate unit. When the packing plate unit is in position, more rust preventive agent may be applied over the upper surface. Thereafter the remaining parts of the valve may be assembled in the conventional fashion.

From the foregoing, it is seen that the present invention provides a high pressure plug valve that is self-lubricated, protected against corrosion, and of small size and light weight for facilitating handling thereof.

It will be understood that modifications and variations may be effected without departing from the scope of the novel concepts of the present invention, but it is understood that this application is to be limited only by the scope of the appended claim.

The invention is hereby claimed as follows:

A high pressure plug valve comprising, a body having an inlet, an outlet, a plug chamber, and a bonnet, said inlet and outlet being in axially spaced relation and on opposite sides of the plug chamber, said bonnet extending from said plug chamber and being normal to the axis of the inlet and outlet, floating seats within said plug chamber at the inlet and outlet, a bore extending through said bonnet and in communication with the plug chamber, a plug in said plug chamber including a cylindrical base having a fluid passageway therethrough and being arranged between said seats and a stem extending through said bonnet bore to the exterior of said body, said stem including a first diametrically reduced portion adjacent said plug base and opposing the bonnet bore, and a second diametrically reduced portion adjacent the first diametrically reduced portion and defining therebetween a bearing shoulder, a ball bearing having an inner race surrounding said stem and engaging said shoulder and an outer race, a flanged nut threadedly received in said bonnet bore and engaging the outer race to hold said bearing in place, and a packing plate unit between said first diametrically reduced portion and the bonnet bore, said packing plate unit including a packing plate ring having in cross section parallel spaced bars interconnected by a web, the bar adjacent the plug chamber being substantially smaller than the other bar, inner and outer grooves defined by the bars and web, loosely fitting O-rings in said grooves, a petroleum-base rust inhibiting agent packed around said O-rings and around said ring, and an annular flat gasket between said smaller bar and the plug chamber and extending completely across the radial distance between said stem and said bonnet bore, said gasket having a radial dimension greater than said radial distance to sealingly engage said stem and said bonnet bore and the rust inhibiting agent about said ring for sealing between the plug chamber and the ball bearing, said gasket being of such a plastic material to protect against the corrosive action of the fluids in the valve body while allowing expansion and contraction caused by fluctuating valve body pressures and temperature, and flat plastic rings on opposite sides of said packing plate web backing said O-rings.

References Cited
UNITED STATES PATENTS

| | | | |
|---|---|---|---|
| 2,868,497 | 1/1959 | Graham | 251—174 X |
| 2,929,606 | 3/1960 | Kaiser | 251—174 |
| 3,122,352 | 2/1964 | Anderson et al. | 251—172 |

WILLIAM F. O'DEA, *Primary Examiner.*

D. MATTHEWS, *Assistant Examiner.*